United States Patent Office 3,014,957
Patented Dec. 26, 1961

3,014,957
6-(SUBSTITUTED BENZOYL)DEHYDROABIETONITRILES AND DERIVATIVES
Willard M. Hoehn, Wilmette, Ill., assignor to G. D. Searle & Co., Chicago, Ill., a corporation of Delaware
No Drawing. Filed Jan. 23, 1959, Ser. No. 788,493
8 Claims. (Cl. 260—465)

The present invention relates to compounds represented by the structural formula

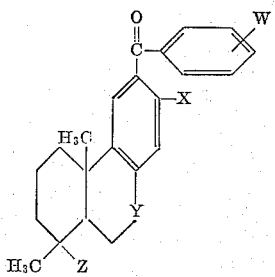

wherein W is selected from the group consisting of hydrogen, lower alkyl, hydroxy, lower alkoxy, and halogeno radicals; X is selected from the group consisting of isopropyl and acetyl radicals; Y is methylene when X is acetyl, and when X is isopropyl, Y is selected from the group consisting of methylene and carbonyl radicals; and Z is selected from the group consisting of cyano, carboxy, and lower carbalkoxy radicals. The lower alkyl and lower alkoxy radicals represented by W may be the straight- and branched-chain isomers of those containing not more than 8 carbon atoms. Lower carbalkoxy radicals represented by Z may be those in which the alkyl portion is a straight- or branched-chain isomer containing not more than 8 carbon atoms.

The 6-(substituted benzoyl)dehydroabietonitriles of the present invention are prepared by treating dehydroabietonitrile with a substituted benzoyl halide under the conditions of the Friedel-Crafts reaction and isolating the product. For example, dehydroabietonitrile is treated with benzoyl chloride in the presence of aluminum chloride catalyst in a nitrobenzene-chlorobenzene solution and the product isolated to yield 6-benzoyldehydroabietonitrile.

Although the alkyl 6-(substituted benzoyl)dehydroabietates can be prepared by several alternate routes, the preferred procedure involves treating an alkyl dehydroabietate with a substituted benzoyl halide under Friedel-Crafts conditions and isolating the product. As a specific example, methyl dehydroabietate is treated with p-toluyl chloride and aluminum chloride in nitrobenzene solution and the product isolated to afford methyl 6-(p-toluyl)-dehydroabietate. Alternatively, the alkyl esters in question can be obtained by alcoholysis of the corresponding nitriles.

The preferred procedure for synthesis of the 6-(substituted benzoyl)dehydroabietic acids of this invention is the hydrolysis of the corresponding esters. For example, methyl 6-(p-chlorobenzoyl)dehydroabietate is treated with sodium hydroxide in aqueous ethanol and the product isolated to afford 6-(p-chlorobenzoyl)dehydroabietic acid. Alternatively, the desired acids can be obtained by hydrolysis of the corresponding nitriles or by treating dehydroabietic acid with a substituted benzoyl halide in the presence of boron trifluoride-ether complex or polyphosphoric acid.

The 6-(substituted benzoyl)-9-ketodehydroabietonitriles and the corresponding carboxylic acids and esters of the present invention are prepared by treating the 6-(substituted benzoyl)dehydroabietonitriles and the corresponding carboxylic acids and esters respectively with an oxidizing agent and isolating the product. For example, treating 6-anisoyldehydroabietonitrile with chromium trioxide in acetic acid and isolating the product results in 9-keto-6-anisoyldehydroabietonitrile. The aforegoing oxidation results also in the 7-acetyl-6-(substituted benzoyl)-1,4a-dimethyl - 1 - substituted - 1,2,3,4,4a,9,10,10a-octahydrophenanthrenes of the present invention. For example, treating 6-anisoyldehydroabietic acid with chromium trioxide in acetic acid and isolating the product affords 7-acetyl-6-anisoyl-1-carboxy-1,4a-dimethyl - 1,2,3,4,4a,9,10,10a-octahydrophenanthrene.

The compounds of this invention are useful because of their absorption of ultra-violet light in the region responsible for erythemal effects. The compounds may be incorporated in standard vehicles suitable for application to the human skin to produce compositions adapted to prevent sunburning. For example, a 1% solution in corn oil applied to the skin gives good protection against burning by sunlight. They also may be incorporated in suitable plastic sheet films which are useful as packaging materials for light-sensitive products.

In the following examples are shown several specific embodiments of the present invention, but it should be understood that the invention is not to be limited to the specific reactions disclosed nor to the precise porportions or conditions set forth since the examples are given only for the purpose of illustration. Quantities are expressed in parts by weight unless otherwise noted. Temperatures are expressed in degrees centigrade (° C.).

EXAMPLE 1

*6-benzoyldehydroabietonitrile*

To a solution of 85 parts of dehydroabietonitrile and 55 parts of benzoyl chloride in 200 parts of nitrobenzene and 600 parts of chlorobenzene is added slowly 85 parts of aluminum chloride while keeping the temperature of the mixture at 5–10°. The reaction mixture is stirred for 5 hours during which time the temperature is allowed to rise to room temperature. After standing overnight the reaction mixture is poured onto 800 parts of cracked ice and extracted with ether. The organic solution is washed successively with 3 portions of 500 parts of water and the water washes discarded. The ether and chlorobenzene are removed by evaporation in vacuo and the nitrobenzene removed by steam distillation. The residue in the flask, obtained by decantation of the water, is dissolved in chloroform, filtered and 95% alcohol added. The solid 6-benzoyl-dehydroabietonitrile, obtained by filtration, is crystallized from chloroform-alcohol; M.P. 145–147.5°; ultra-violet absorption at 249 millimicrons, extinction coefficient 14,000; specific rotation in alcohol +69.5°.

EXAMPLE 2

*7-acetyl-6-benzoyl-1-cyano-1,4a-dimethyl-1,2,3,4,4a, 9,10,10a,octahydrophenanthrene*

A solution of 10 parts of chromium trioxide, 8 parts of water and 42 parts of acetic acid is added slowly with stirring to a solution of 10 parts of 6-benzoyldehydroabietonitrile dissolved in 50 parts of acetic acid which has been warmed to 60°. The temperature quickly rises to about 70° and the addition of chromic acid solution is adjusted so as to maintain a temperature at 68–72°. After all of the chromium trioxide solution has been added the reaction mixture is allowed to stand at room temperature for about 15 hours.

The reaction mixture is diluted with an equal volume of water, filtered, the solid residue washed with about 100 parts of water and filtrate and washings discarded. The solid is suspended in about 150 parts of 5% sodium hydroxide solution, heated to 55–60° for about 10 minutes, filtered, and the solid residue washed with water. The solid residue is recrystallized from a methylene chloride-methyl alcohol solution which is allowed to evaporate slowly. During the evaporation, a solid separates which is recovered and recrystallized from methylene chloride-methyl alcohol to yield 7-acetyl-6-benzoyl-1-cyano-1,4a-dimethyl - 1,2,3,4,4a,9,10,10a - octahydrophenanthrene which after drying melts at 222–224° and has a specific rotation of +44.5° (chloroform). The product has the structural formula

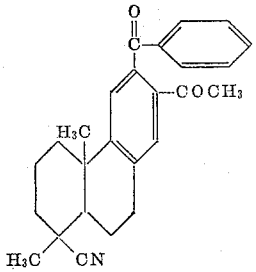

EXAMPLE 3

*6-benzoyl-9-ketodehydroabietonitrile*

The mother liquors from the recrystallization described in Example 2 are permitted to evaporate slowly and the crystalline material which deposits is recovered by filtration, washed with a small quantity of alcohol and dried. The product, 6-benzoyl-9-ketodehydroabietonitrile melts at 206–208° and has a specific rotation in chloroform of +26.7°.

EXAMPLE 4

*Methyl-6-benzoyldehydroabietate*

To a stirred solution of 56 parts of methyl dehydroabietate in 240 parts of nitrobenzene and 36 parts of benzoyl chloride is added 45 parts of aluminum chloride at 0–10°. The mixture is stirred at 10° for 30 minutes then allowed to stand at room temperature overnight. The reaction mixture is poured onto 500 parts of cracked ice, the aqueous layer decanted and the nitrobenzene layer washed with 1,000 parts of water. The nitrobenzene is removed by steam distillation then the water removed by decantation. The solid residue is recrystallized from a 95% ethanol solution after decolorization of that solution with charcoal. The crystalline methyl 6-benzoyldehydroabietate, M.P. 135–136°, has a specific rotation of +71.8°. Its infra-red spectrum possesses maxima at 5.81, 5.96, 6.20, 6.25, 7.21 and 7.98 microns. It absorbs in the ultra-violet from about 220 to 310 millimicrons.

EXAMPLE 5

*6-benzoyldehydroabietic acid*

To a solution of 15 parts of sodium hydroxide and 65 parts of 70% ethanol is added 5 parts of methyl 6-benzoyldehydroabietate and the solution heated gently on the steam bath for 6 hours. As the alcohol evaporates during the heating period the total volume is kept constant by the addition of water. The reaction mixture is poured into 600 parts of 10% hydrochloric acid and the precipitated acid collected by filtration. After two recrystallizations from 2B ethanol pure 6-benzoyldehydroabietic acid, M.P. 168–171°, is obtained. [α]$_D$=+93.0°. It possesses maxima in the infra-red at 3.02–3.06, 5.80, 5.90, 5.95, 6.20, 6.25, 7.20, 7.75 and 7.83 microns. In the ultra-violet it absorbs from 220 to 310 millimicrons.

EXAMPLE 6

*n-Butyl-6-benzoyldehydroabietate*

A solution of 10 parts of 6-benzoyldehydroabietic acid in 300 parts of n-butanol and 2 parts of concentrated sulfuric acid is heated at reflux for 4 hours. The reaction mixture is poured into 500 parts of water and the resultant mixture extracted with several portions of ether. The ether extracts are combined and washed successively with 5% sodium bicarbonate solution and water, dried over anhydrous sodium sulfate, and evaporated to dryness in vacuo. The residue is n-butyl-6-benzoyldehydroabietate which absorbs in the ultra-violet from 220 to 310 millimicrons.

EXAMPLE 7

*6-(p-chlorobenzoyl)dehydroabietonitrile*

To a solution of 40 parts of dehydroabietonitrile and 30 parts of p-chlorobenzoyl chloride in 200 parts of nitrobenzene and 200 parts of chlorobenzene is added 35 parts of aluminum chloride in small portions while keeping the temperature at 0–5°. The reaction mixture is stirred at 0–5° for 4 hours then allowed to stand at room temperature overnight. The mixture is poured onto 400 parts of cracked ice and the organic material extracted into ether. The ether layer is washed with water and heated in vacuo to remove the ether and chlorobenzene. Steam distillation of the residual solution removes the nitrobenzene. Decantation of the water leaves a residual solid which is recrystallized from 95% ethanol to afford 6-(p-chlorobenzoyl)dehydroabietonitrile. It absorbs in the ultra-violet from 220 to 310 millimicrons.

EXAMPLE 8

*Methyl 6-(p-toluyl)dehydroabietate*

To a stirred solution of 28 parts of methyl dehydroabietate and 20 parts of p-toluyl chloride in 120 parts of nitrobenzene is added 25 parts of aluminum chloride in small portions at 0–5°. Stirring is continued for 2 hours, then the mixture allowed to stand overnight at room temperature. It is poured over 300 parts of cracked ice, the aqueous layer decanted and the organic layer washed with 500 parts of water. Steam distillation of the nitrobenzene followed by decantation of the water leaves a residue which is recrystallized from 95% ethanol to afford methyl-6-(p-toluyl)dehydroabietate. It absorbs in the ultra-violet from 220 to 310 millimicrons.

By substituting an equivalent quantity of p-n-propylbenzoyl chloride and otherwise proceeding according to the herein described processes, methyl-6-(p-n-propylbenzoyl)dehydroabietate is obtained.

EXAMPLE 9

*n-Butyl-6-anisoyldehydroabietate*

To a stirred solution of 32 parts of n-butyl dehydroabietate in 150 parts of nitrobenzene and 18 parts of anisoyl chloride is added gradually 23 parts of aluminum chloride at 0–10°. The reaction mixture is stirred at 0–10° for 2 hours then allowed to stand overnight at room temperature. The mixture is poured onto 300 parts of cracked ice, the aqueous layer decanted and the nitrobenzene layer stripped of solvent by steam distillation. Decantation of the water results in a residual solid which is recrystallized from 95% ethanol to produce n-butyl-6-anisoyldehydrobietate. It absorbs in the ultra-violet from 220 to 330 millimicrons.

EXAMPLE 10

*6-salicyloyldehydroabietonitrile*

To a stirred solution of 20 parts of dehydroabietonitrile and 14 parts of o-methoxybenzoyl chloride in 125 parts of nitrobenzene and 125 parts of chlorobenzene is added 18 parts of aluminum chloride while keeping the temperature at 0–5°. The reaction mixture is stirred at 0–5° for 5 hours, allowed to stand overnight at room temperature and finally heated at 50–55° for 1 hour. The cooled mixture is poured over 250 parts of cracked ice and the aqueous layer decanted. The organic layer is dissolved in ether and the ether solution washed with water and stripped of ether and chlorobenzene by heating in vacuo. The nitrobenzene is removed by steam distillation then the water decanted leaving a solid which is recrystallized from 95% ethanol to yield 6-salicyloyldehydroabietonitrile. It absorbs in the ultraviolet from 220 to 335 millimicrons.

EXAMPLE 11

*7 - acetyl - 6 - (p - n - propylbenzoyl) - 1 - carbomethoxy-1,4a, dimethyl-1,2,3,4,4a,9,10,10a-octahydrophenanthrene*

A solution of 5 parts of chromium trioxide in 4 parts of water and 21 parts of acetic acid is added gradually to a stirred solution of 5 parts of methyl-6-(p-n-propylbenzoyl) dehydroabietate in 30 parts of acetic acid at 60°. The temperature is kept at 65–70° by regulating the rate of addition. The reaction mixture is then allowed to stand at room temperature overnight. Dilution of the mixture with water results in formation of a solid which is collected by filtration and washed with water. Acidic impurities are removed by washing the solid first with a warm solution of 5% sodium hydroxide then with water. The crude product is recrystallized from a methylene chloride-methyl alcohol solution to produce 7-acetyl-6-(p-n-propylbenzoyl) - 1 - carbomethoxy - 1,4a - dimethyl - 1,2,3,4,4a,9,10,10a-octahydrophenanthrene which absorbs in the ultraviolet from 220 to 310 millimicrons.

EXAMPLE 12

*Methyl 9-keto-6-(p-n-propylbenzoyl)dehydroabietate*

The methylene chloride-methyl alcohol mother liquors obtained from the recrystallization described in Example 11 are concentrated to a small volume and the crystals which form collected by filtration. The crystalline material is methyl-9-keto-6-(p-n-propylbenzoyl)- dehydroabietate which absorbs in the ultra-violet from 220 to 310 millimicrons.

What is claimed is:
1. A compound of the structural formula

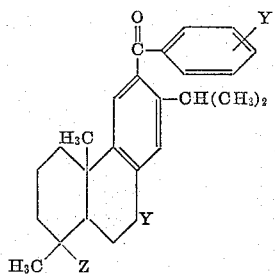

wherein Z is selected from the group consisting of cyano, carboxy, and lower carbalkoxy radicals; and Y is selected from the group consisting of hydrogen, chloro, lower alkyl, hydroxy, and lower alkoxy radicals.
2. 6-benzoyldehydroabietonitrile.
3. 6-benzoyldehydroabietic acid.
4. Methyl 6-benzoyldehydroabietate.
5. 6-benzoyl-9-ketodehydroabietonitrile.
6. 7 - acetyl - 6 - benzoyl - 1 - cyano - 1,4a - dimethyl-1,2,3,4,4a,9,10,10a-octahydrophenanthrene.
7. Methyl - 9 - keto - 6 - (p - n - propylbenzoyl) - dehydroabietate.
8. 7-acetyl - 6 - (p - n -propylbenzoyl) - 1 - carbomethoxy - 1,4a - dimethyl-1,2,3,4,4a,9,10,10a - octahydrophenanthrene.

References Cited in the file of this patent
UNITED STATES PATENTS

| | | |
|---|---|---|
| 2,816,907 | Hoehn | Dec. 17, 1957 |
| 2,846,463 | Hoehn | Aug. 5, 1958 |
| 2,854,471 | Hoehn | Sept. 30, 1958 |
| 2,854,474 | Bible | Sept. 30, 1958 |

OTHER REFERENCES

Simons: Industrial and Engineering Chemistry, volume 39, No. 3, March 1947, page 238.

UNITED STATES PATENT OFFICE
CERTIFICATE OF CORRECTION

Patent No. 3,014,957                             December 26, 1961

Willard M. Hoehn

It is hereby certified that error appears in the above numbered patent requiring correction and that the said Letters Patent should read as corrected below.

Column 2, line 39, for "5 hours" read -- 4 hours --; column 4, line 62, for "soyldehydrobietate" read -- soyldehydroabietate --; column 6, lines 3 to 14, at the lower right-hand portion of the formula, strike out the "Y".

Signed and sealed this 17th day of July 1962.

(SEAL)
Attest:

ERNEST W. SWIDER
Attesting Officer

DAVID L. LADD
Commissioner of Patents